United States Patent [19]
Biber

[11] 3,868,712
[45] Feb. 25, 1975

[54] PNEUMATICALLY REACTIVE EXPOSURE CONTROL SYSTEM

[75] Inventor: Conrad H. Biber, Needham, Mass.

[73] Assignee: Polaroid Corporation, Cambridge, Mass.

[22] Filed: Apr. 11, 1973

[21] Appl. No.: 349,960

[52] U.S. Cl. .............. 354/230, 354/234, 354/235, 354/257, 354/271
[51] Int. Cl. ............................................. G03b 9/14
[58] Field of Search ............... 95/10 CE, 53 E, 54; 335/240; 354/230, 232, 233, 234, 235, 247, 271, 272, 257

[56] References Cited
UNITED STATES PATENTS

| | | | |
|---|---|---|---|
| 2,523,660 | 9/1950 | Hulstein | 95/53 E |
| 2,528,734 | 11/1950 | Brass | 335/240 |
| 3,091,164 | 5/1963 | Brandt | 95/54 |
| 3,641,889 | 2/1972 | Eloranta | 95/10 CE |

Primary Examiner—Samuel S. Matthews
Assistant Examiner—Russell E. Adams, Jr.
Attorney, Agent, or Firm—Gerald L. Smith

[57] ABSTRACT

An exposure control system and mechanism characterized in the use of a solenoid which is energized to retract a plunger within an excitation winding thereof to cause movement of exposure mechanism blades into an aperture blocking position. An interval of exposure is defined by de-energizing the excitation winding of the solenoid to permit the plunger thereof to be withdrawn under a spring drive which simultaneously moves the exposure mechanism to define varying aperture values. The invention provides control over the rate of both closing interval and aperture determining spring biased movement of the exposure mechanism. This control is provided by pneumatically regulating the movement of the plunger within the excitation winding.

31 Claims, 8 Drawing Figures

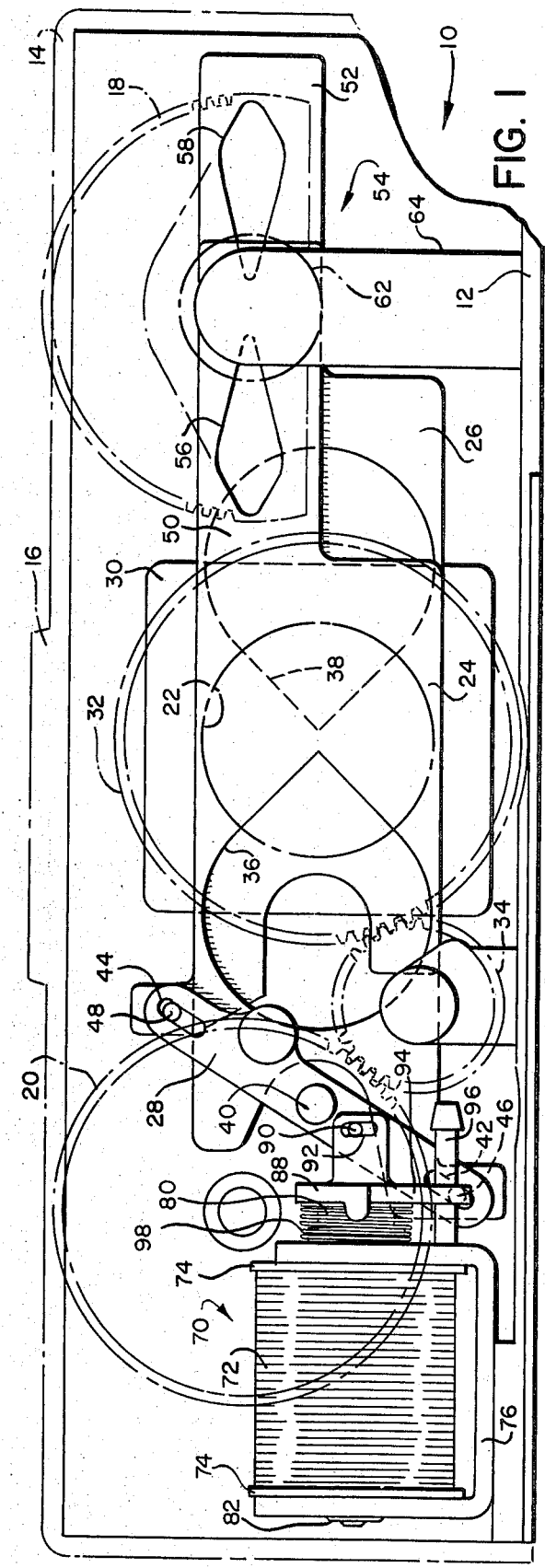
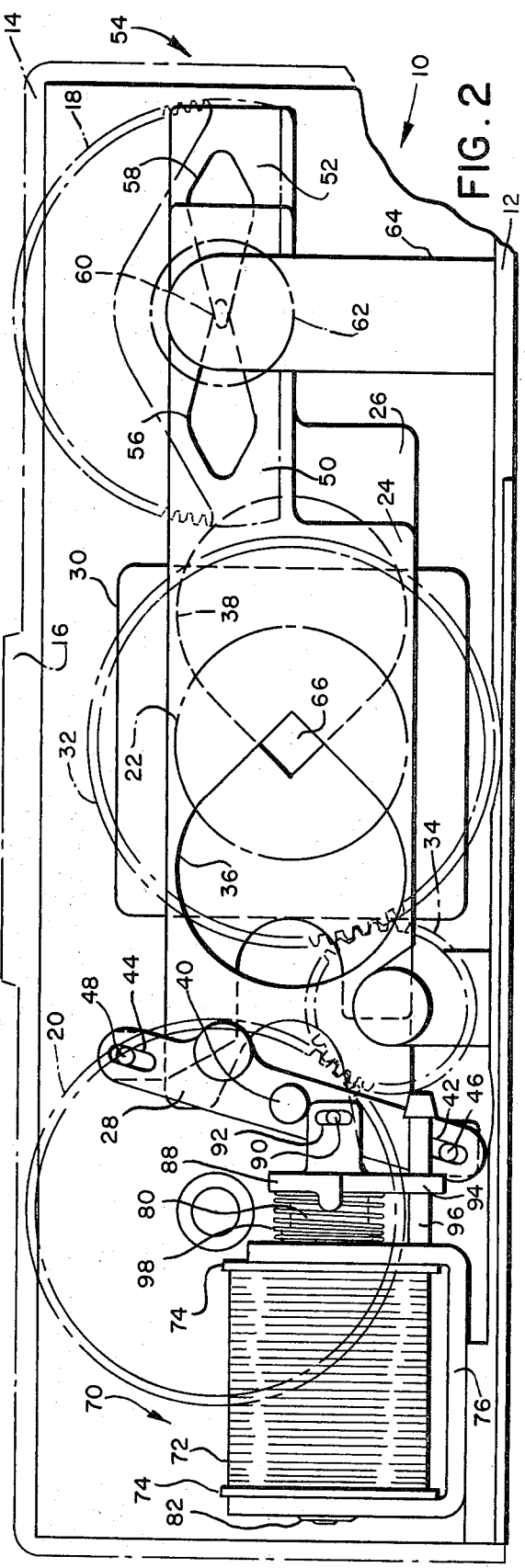
FIG. 1
FIG. 2

PNEUMATICALLY REACTIVE EXPOSURE CONTROL SYSTEM

BACKGROUND OF THE INVENTION

Automatic exposure control systems for photographic devices function to evaluate scene brightness for levels of illumination, weight this evaluation with respect to the sensitometric characteristics of a film being exposed and regulate one or more variable exposure control parameters, for instance exposure interval and aperture size, in correspondence with the weighted evaluation. Certain of these control systems provide for automatic control over both aperture selection and shutter speed under a predetermined program devised to optimize parameter selection for the more often encountered scene lighting conditions. In designing such optimized exposure control programs, generally it is desirable to maximize the depth of field characteristics of a resultant image while making an exposure in the shortest exposure interval available in order to record scene activity without blurring. Ideally, therefore, apertures selected at such higher f/stop values as may be practically available, while corresponding shutter speed is selected as fast as possible in view of the lighting conditions and desired aperture setting. For the most part, the exposure programs compromise or draw a balance between achieving large depth of field throught the use of small relative apertures and in selecting appropriate exposure interval times.

In addition to the foregoing photographic exposure criteria, the shutter systems also may be called upon for duty within cameras incorporating complex cycle logic. For instance, should the shutters or exposure mechanisms be required to perform within the cycle of a fully automated single lens reflex camera, they must assume an open status providing for maximum aperture diameter size while viewing and focusing for purposes of deriving sufficient light for reflex viewing optics. Following a viewfinding and focusing procedure with such a camera, the exposure control system must automatically close to fully block its optical path in order to permit conversion to an exposure mode without jeopardizing the light-tight integrity of its exposure chamber. This procedure usually involves the movement of a reflex mirror or the like to provide a realignment of the optical path of the camera. Following the delay occasioned by this operational mode adjustment, the exposure control system then functions automatically to commence an exposure interval and provide the above-described dual exposure parameter control in accordance with the desired exposure program. At the termination of an exposure interval, the exposure control system is called upon to block the passage of scene light to the exposure plane or exposure chamber and to remain in that blocking position until the optical path components of the camera reassume the earlier described initial viewing-focusing mode and until such other operations such as automatic film processing and the like are carried out. At the termination of a cycle, theh exposure control mechanism again is required to assume maximum aperture size to permit viewing and focusing for a next succeeding photographic cycle.

When an exposure control system is called upon to perform within such a complex cycle while remaining of such size as to be incorporated within a very thin and compact camera structure, severe design limitations are encountered. For instance, conventional techniques utilizing relatively strong springs are not suitable inasmuch as the power levels required for loading such springs require impractical drives and linkages. Alternately, manual spring cocking militates against desired automaticity of the cameras.

One exposure control system ideally suited for use within thin and compact fully automated single lens reflex cameras suited for carrying in the pocket of a garment is described in U.S. Pat. No. 3,641,889. The exposure control system described in that patent is characterized in the use of a tractive electromagnet in the form of a solenoid, the plunger of which is coupled in driving relationship with a shutter blade mechanism. The members of this mechanism are designed to establish a time dependent variation of aperture values over the light entrance opening of the camera as the blades are moved between open and closed terminal positions. Connection between the elements or blades and solenoid is arranged such that the blades are closed upon energization of the solenoid and are opened under a relatively light spring bias at such time as the solenoid is selectively de-energized by a control circuit.

An exposured interval is commenced by de-energizing the solenoid from an energized state so as to permit the blades to commence to move from a blocking terminal position to define varying aperture values. At such time as a proper exposure value can be achieved, the solenoid again is energized to rapidly return the blades to their closed orientation. Because the blades define an aperture of maximum width at such time as the solenoid is permitted to remain de-energized, the exposure control system ideally is suited for a photographic cycle requiring a normally fully open shutter condition prior to the commencement of a cycle as well as periods of full shutter closure for securing the exposure chamber of the camera during operational mode conversion procedures.

To achieve a more useful exposure program for this form of shutter or exposure mechanism, it is desirable that the opening rate of the shutter blades defining the noted variation of progressively increasing aperture widths be relatively slow, while the rate of shutter closure derived through solenoid energization be as rapid as possible. A slower opening rate provides dual advantage. For instance, improved depths of field are available at more frequently encountered scene brightness levels and a requisite anticipation feature required of the control circuit of the system for reversing the blades as an appropriate aperture value is approached is more readily designed. This anticipation feature preferably is provided through a photocell "sweep" feature wherein the light sensing elements of a camera mounted control circuit are uncovered simultaneously and in mutual correspondence with the progressive variation of aperture over the taking lens optical path. The sweep or anticipation feature of the control arrangement is present to accommodate for the amount of delay required in stopping exposure mechanism blade movement and causing them to move in a reverse direction for purposes of terminating an exposure. Inasmuch as the anticipation required is fixedly inserted through a design of the contour of the sweep mechanism, it is necessary that the opening motion of the exposure mechanism be carried out from cycle to cycle in statistically repeatable fashion. Accordingly, the systems preferably are designed providing for an efficient factory calibration thereof. Additionally, a lowered rate of opening movement for this form of exposure mechanism or shutter advantageously simplifies the anticipation feature design inasmuch as the rate of response required by the anticipation feature is lessened. In effect, exposures utilizing high aperture values are more efficiently obtained.

Another desirable feature for such exposure control systems resides in providing a high shutter closure rate. Where such high rates are available, shutter efficiency improves to, in turn, improve the photographic quality of the recorded images of a wide variety of scenes.

SUMMARY OF THE INVENTION

The present invention is addressed to an exposure control system and components thereof characterized in the unique incorporation of pneumatic regulation of the opening characteristics of a photographic exposure mechanism. This exposure control system is one of a variety selectively utilizing a tractive electromagnetic device in the form of a solenoid as well as a spring bias to move the mechanical elements of an exposure mechanism in a manner defining a time-dependent progressive variation of aperture values over the light entrance opening of a camera. By simultaneously combining the effects of this spring bias with a pneumatically derived retardation of the plunger element of a solenoid during such aperture defining movement, a desirably programmed and controlled definition of aperture values for given levels of scene brightness is achieved. The pneumatic damping technique of the invention enjoys the further advantage of being readily factory calibrated as well as providing for the enhancement of the closing characteristics of the noted form of exposure control mechanism.

In a preferred embodiment, the invention features an exposure control system drive arrangement present as a solenoid having an excitation winding and a plunger retractable thereinto upon energization thereof. The solenoid is so structured as to provide a pneumatically active cylindrical portion within the excitation winding, this portion being configured having a controlling orifice. The assembly also utilizes a spring bias to draw the plunger outwardly with each transition of the excitation winding from an energized to a de-energized state. By regulating the noted orifice, the rate of outward excursion of the plunger is accurately controllable. The plunger, in turn, is driveably associated with the elements of an exposure mechanism such that upon such outward excursion, the exposure mechanism elements define progressively varying aperture values over the light entrance opening of a camera. When the excitation winding is energized, the plunger is rapidly retracted and the rate of such retraction is enhanced by virtue of the presence of the noted orifice. Accordingly, the opening characteristics of the exposure mechanism are advantageously regulated and the closing characteristics thereof are enhanced to improve shutter efficiency.

Through an arrangement providing valve means within the pneumatically active portion of the solenoid, more precise control of the excursion rate of the plunger as well as a provision for simplified factory calibration are provided.

Another feature and object of the invention is to provide exposure control apparatus for a photographic camera which includes an exposure mechanism blade assembly movable between a closed terminal position and open positions, the assembly being configured to define a variation of aperture values when so moved. The apparatus further includes biasing means such as a spring for biasing the exposure mechanism apparatus to move toward the noted open positions. Further, the apparatus includes tractive electromagnetic means, for instance a solenoid, which is energized to move the exposure mechanism blade arrangement toward the closed terminal position and which is de-energizable to permit the movement toward open positions under the noted spring bias. Pneumatic means are provided for regulating the rate of the exposure blade assembly movement under the bias so as to derive a programmed variation of aperture values.

Another feature and object of the invention is to provide a solenoid assembly for use within an exposure control system, the assembly providing an energizable drive component for an exposure mechanism. This solenoid is characterized in having an excitation winding and plunger retractable thereinto upon energization thereof. The solenoid is so configured as to effect pneumatically controllable activity between its plunger and the mounting assembly within which it rides. By selectively valving or regulating this pneumatically active assembly, the solenoid may be utilized to accurately control the spring biased opening movement of an exposure mechanism as that mechanism defines a variation of aperture values in the course of an interval of photographic exposure.

Other objects of the invention will, in part, be obvious and will, in part, appear hereinafter. The invention, accordingly, comprises the system and apparatus possessing the construction, combination of elements and arrangement of parts which are exemplified in the following detailed disclosure and the scope of the invention is indicated in the appended claims.

For a fuller understanding of the nature and objects of the invention reference should be had to the following detailed description taken in connection with the accompanying drawings.

BRIEF DESCRIPTION OF THE DRAWINGS

FIG. 1 is a front elevational view of an exposure control housing incorporating the exposure control mechanism and apparatus of the instant invention and showing an orientation of components providing for the full blocking of the light entrance opening of a photographic camera;

FIG. 2 is a front elevational view of the exposure control housing of FIG. 1 showing the exposure mechanism components thereof as they are oriented to define an aperture opening of intermediate exposure value;

DETAILED DESCRIPTION

Figure 4:
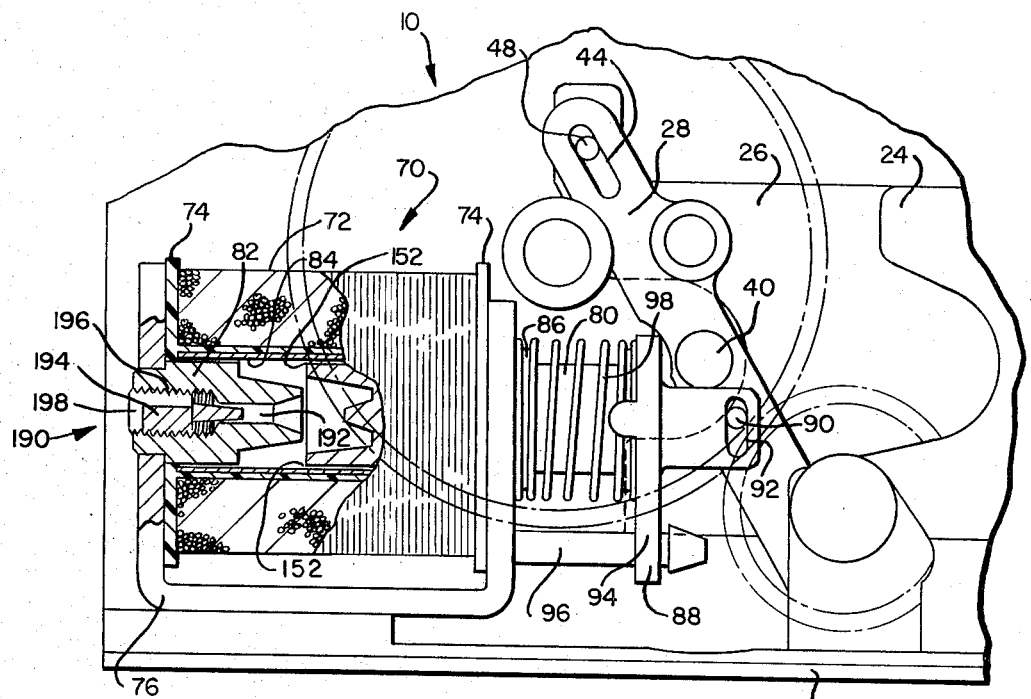
FIG. 4 is a fragmentary view of a portion of the mechanism revealed in FIGS. 1 and 2 with portions broken away to reveal internal features.

The mechanism of the instant invention is particularly suited for use within the exposure control housing of a very thin and compact camera suited for carrying in the pocket of a garment. Such a camera has been described in a copending application for U.S. Pat., Ser. No. 134,733, entitled "Reflex Camera" by E. H. Land, V. K. Eloranta and I. Blinow, filed Apr 16, 1971 and assigned in common herewith. The noted exposure control housing must be foldable into a nested orientation with the other components of the thin camera to achieve requisite compactness and, accordingly, the space available for all the components of a fully automated exposure system is extremely limited. Such components include focusing gears, trim adjustment mechanisms, follow-focus actuating and trim systems, lens mountings and the like. A more detailed illustration of such components as they are fashioned for use within the exposure control housing is provided in a copending application for U.S. Pat. by L. G. Douglas, Ser. No. 168,671, entitled "Apparatus and System for Flash Photography" filed Aug. 3, 1971 and assigned in common herewith. In the interest of facilitating the description of the mechanism of the instant invention, certain of these above-cataloged components are deleted from the drawings and description to follow.

Referring to FIG. 1, the noted thin and compact exposure control housing is illustrated generally at 10. The principal supporting structure for housing 10 is present as a rear casting 12 which is selectively machined to support the components of the mechanism. Surroundingg the front and top of casting 12 is a front cover 14 which is structured at 126 to support a packaged flashlamp array and related components and which includes openings (not shown) through which protrude manually adjustable trim and focus wheels, the boundaries of which are shown respectively at 18 and 20.

Centrally disposed within the back wall of casting 12 is an annular exposure or light entrance opening 22, the periphery of which substantially defines the largest available aperture width for the mechanism.

The light regulating or valve assembly within housing 10 is present as a dual bladed exposure control mechanism or arrangement including elongate blades 24 and 26 as well as an interconnecting actuator 28, the operation of which resembles that of a "walking beam" and is so identified in the description to follow. Blades 24 and 26 are slideably mounted within a bracket 30 fixed, in turn, to rear casting 12. Bracket 30 additionally serves as a support for an externally threaded lens housing or bezel, the periphery of which is illustrated by circular outline 32. Connection between bezel 32 and focus wheel 20 is provided by an idler gear shown at 34.

Blades 24 and 26, respectively, are configured having teardrop-shaped openings 36 and 38 formed therewithin. Openings 36 and 38 are positioned within respective blades 24 and 26 in a reversed sense such that, as they overlap, they combine to form a symmetrically configured aperture opening across light entrance opening 22.

The symmetry of the aperture openings defined by the blades 24 and 26 is realized as a consequence of their pinned connection with reciprocally movable walking beam 28. Walking beam 28 is seen to be journalled about its midpoint for rotation about a stud 40 extending from rear casting 12. Elongate slots as at 42 and 44 are formed in the outwardly disposed portions of walking beam 28 for the purpose of providing connection with pins 46 and 48 fixed to and extending, respectively, from blades 24 and 26. Thus interconnected, the blades 24 and 26 may move simultaneously and in correspondence with each other to define symmetrically configured aperture openings of progressively varying values over light entrance opening 22. Elongate slots 46 and 48 serve the function of accommodating for the horizontally restricted movement of the blades 24 and 26 along chords extending through the locus of rotation of the tip of walking beam 28.

Blades 24 and 26 also are configured having extensions or elongate portions, respectively shown at 50 and 52, which extend through a light detecting station, shown generally at 54. Extensions 50 and 52. Respectively, are formed incorporating secondary openings 56 and 58 which are configured in light regulating correspondence with the configurations of respective openings 36 and 38. Secondary openings 56 and 58 are oriented upon respective elongate portions or extensions 50 and 52 in a manner wherein they overlap in asymmetrical and mutually reversed sense to define a secondary aperture opening as at 60 in FIG. 2 within light detecting station 54. Additionally, openings 56 and 58 are so arranged such that the secondary aperture 60 defined thereby, in turn, is located intermediate the photosensing elements of an exposure control circuit and an entrance optical assembly including a lens outlined at 62. The supporting structure for lens 62 is shown generally at 64.

The instantaneous aperture values defined by secondary openings 56 and 58 are derived in synchronism with those present at exposure opening 22. Accordingly, the selective attenuation of scene light entering detecting station 54 serves to modulate a resultant signal to provide an instantaneous aperture value input to an exposure control circuit. Such input permits the circuit to derive a two parameter exposure control.

To operate in conjunction with the program of a reflex photographic cycle, blades 24 and 26 must be actuated in a manner whereby openings 36 and 38 define an aperture of maximum available width prior to the commencement of such cycle. This normally open shutter condition facilitates viewing and focusing procedures. When operated to define an internval of exposure, exposure mechanism blades 24 and 26 are driven into an orientation wherein they fully block light entrance opening 22 as shown in FIG. 1. An exposure internval is defined by moving the blades in synchronism to gradually open and define progressively varying aperture values until a predetermined exposure value is reached. When this value is reached, for instance, as illustrated by the definition of an aperture opening 66 in FIG. 2, a tractive electromagnetic device in the form of a solenoid such as that depicted generally at 70 is energized to terminate the exposure interval by actuating exposure mechanism assembly including blades 24 and 26 and walkling beam 28 to cause their return to the closed orientation illustrated in FIG. 1.

Figure 3:
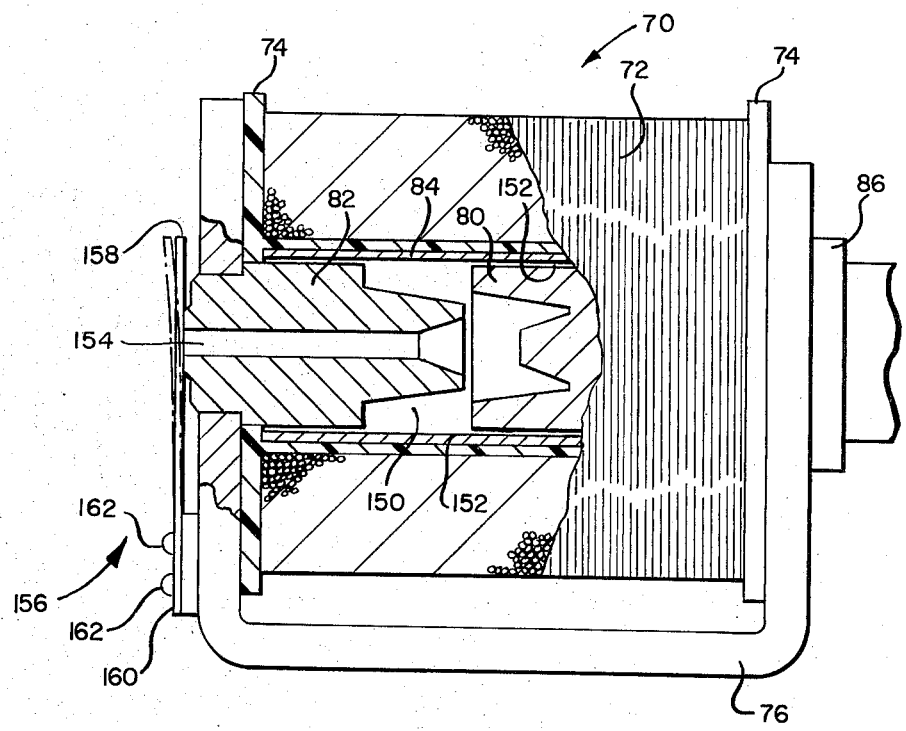
FIG. 3 is a fragmentary view of a solenoid assembly which may be utilized with the mechanism of FIGS. 1 and 2 with portions broken away to reveal internal structure.

Soleoid 70, the common or general components of which are revealed in more enhanced detail in FIGS. 3 and 4, is structured to include an excitation winding 72 layer wound about an insulative supporting bobbin 74. Bobbin 74, in turn, is positioned within a U-shaped frame 76 fixed, in turn, to rear casting 12. Symmetrically disposed internally of excitation winding 72 is a cylindrically shaped movable armature or plunger 80 and a cylindrically shaped stationary armature or plug 82 (FIGS. 3 and 4). Plunger 80 slidably rides upon the internal surface of a non-magnetic liner 84 forming the internal hollow core of bobbin 74. An annular flux ring 86 (FIGS. 3 and 4) is positioned over the forward end of liner 84 and in contact with the forward face of frame 76 for the purpose of improving the magnetic flux circuit path linkage between frame 76 and plunger 80 as well as for rendering the plunger 50 pneumatically reactive within the chamber defined by liner 84, plug 82 and plunger 80.

Solenoid 70 is aligned within casting 12 such that an end cap fixed to the outward or exposed tip of plunger 80 is loosely connectable with a pin 90 fixed to and extending outwardly from walking beam 28. A slot as at 92 provides for such connection. The lower portion of cap 88 is formed as at 94 to slidably ride along a horizontally disposed pin 96 fixed to and extending from frame 76. With the latter sliding arrangement, the alignment of the connection at slot 92 with pin 90 is maintained during translational movement of plunger 80.

Plunger 80 is biased outwardly by an opening spring 98. Compression spring 98 is constrained between the inward face of cap 88 and frame 76. Accordingly, the spring serves to normally bias walking beam 28 to rotate in a direction urging blades 24 and 26 to assume orientations defining an aperture of maximum width. Therefore, the exposure mechanism ideally provides a normally open condition for reflex viewing purposes and the like. At the commencement of a photographic cycle, winding 72 of solenoid 70 is energized to rapidly retract plunger 80 therewithin to rotate walking beam 28 and drive blades 24 and 26 into the blocking orientation shown in FIG. 1. Following appropriate optical path conversion, a control circuit de-energizing winding 72 to permit opening spring 98 to drive plunger 80 outwardly and, in turn, rotate walking beam 28 in a direction permitting blades 24 and 26 to define increasingly varying aperture values as at 66 in FIG. 2. The exposure interval is terminated by again energizing winding 72 to rapidly retract plunger 80 against the bias exerted by opening spring 98. Following optical path conversion, winding 72 is again de-energized to cause the mechanism to assume its normal or standby condition.

Figure 5:
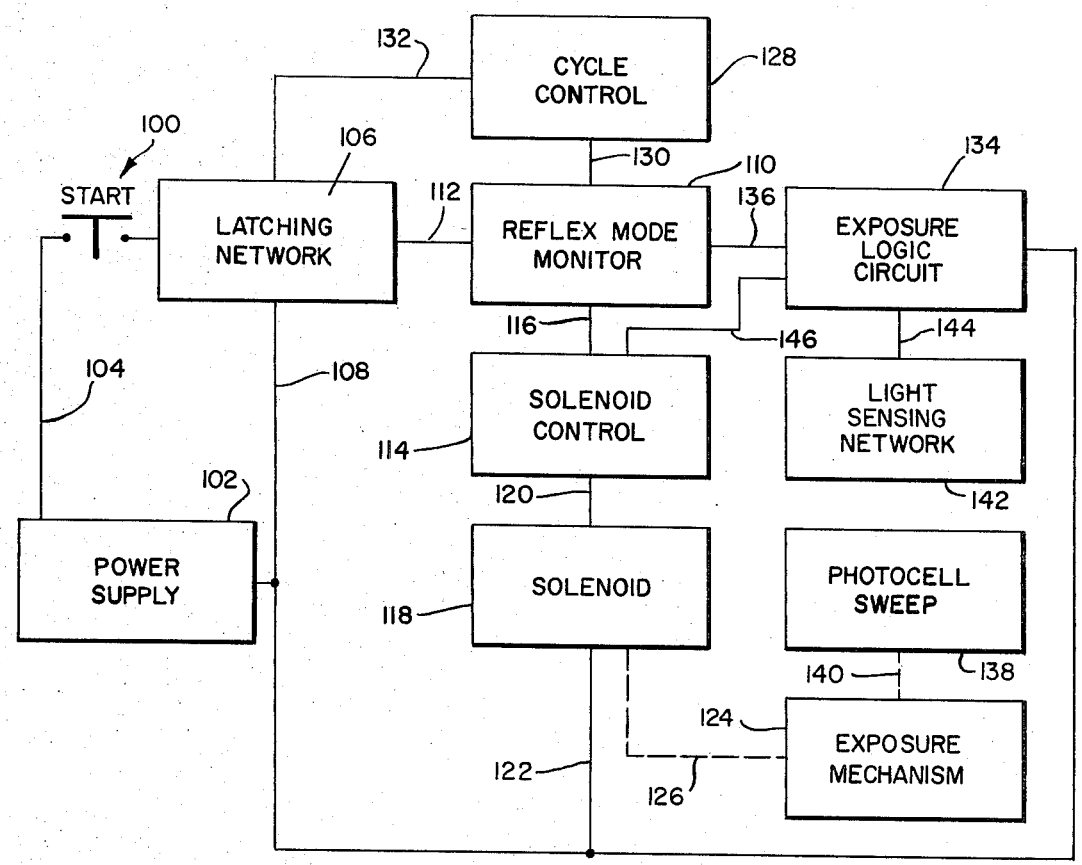
FIG. 5 is a schematic diagram showing the functional components and circuit interrelationships of a control system for use with the mechanism of FIGS. 1 and 2.

Looking to FIG. 5, a block diagram of a typical exposure control system for causing the instant exposure mechanism to operate according to the abovedescribed photographic cycle program is revealed. With the depression of a start switch 100, a power supply 102 connected thereto along line 104 is coupled to activate a latching network 106 from along line 108. Network 106 serves to selectively power the remainder of the circuit even though switch 100 may be disconnected. With the activation of latching network 106, a reflex mode monitor 110 is activated from line 112. Described in more detail in a copending application for U.S. Pat. by J. P. Burgarella, P. P. Carcia and R. C. Kee entitled "Photographic Control System and Apparatus Having Self-monitoring Features," Ser. No. 213,303, filed Dec. 29, 1971 and assigned in common herewith, mode monitor 110 develops a signal to selectively initiate and de-activate control functions within an automatic reflex camera. Initially, monitor 110 activates a solenoid control circuit 114 as from along line 116. In turn, control circuit 114 actuates solenoid 70 shown here as block 118. This activation is carried out from lines 120 and 122. When activated, winding 72 of solenoid 70 is energized to rapidly retract plunger 80 and cause the closure of exposure mechanism blades 24 and 26.

The exposure mechanism assembly is represented functionally in the drawing at block 124 and its mechanical connection with solenoid 70 is indicated by dashed line 126. When the fully blocking position as illustrated in FIG. 1 is attained by the exposure mechanism 124, mode monitor 110 signals a cycle control function as depicted at block 128 from line 130. Function 128 serves to convert a reflex optical path from a viewing-focusing orientation into an orientation suited for exposing a film unit and is described in the above-noted application for U.S. Pat. Ser. No. 134,733. Power for function 128 is shown as deriving from along line 132 connecting latching network 106 therewith.

When mode conversion is fully carried out, monitor 110 activates an exposure 110 activated an exposure logic circuit shown at block 134 from along line 136. Simultaneously, a cycle mode signal is provided along line 116 to solenoid control 114. Solenoid control 114, in turn, causes the de-energization of winding 72 of solenoid 70 as depicted by connecting line 120 in function block 118. As described in connection with FIGS. 1-3, spring 98 commences to drive plunger 80 outwardly to, in turn, rotate walking beam 28 and cause a progressive variation of aperture values across opening 22. Simultaneously, secondary openings 56 and 58 provide a corresponding opening of the light path leading into the light sensing network of the control system of the camera. This gradual development of opening 60 (FIG. 2) for "photocell sweep" activity is depicted by function block 138 in FIG. 5, the mechanical interconnection of closure mechanism 124 therewith being depicted by a dashed line 140.

As the photocell sweep function 138 defines a progressively enlarging opening, the light sensing network as depicted by block 142 evaluates scene lighting to develop a signal representative of the value of the exposure being made. When the value of this exposure reaches a predetermined level, network 142 signals exposure logic circuit 134 from along line 144. Circuit 134, in turn, signals solenoid control circuit 114 from along line 146 to cause the re-energization of winding 72 of solenoid 70. Plunger 80 is retracted rapidly and an exposure is terminated. With exposure termination, mode monitor 110 again signals cycle control 128 to complete the photographic cycle by realigning the exposure components of the included camera to assume a viewing-focusing mode and carry out such other operations as may be required. A light sensing network which may be utilized in connection with function 142 is described in U.S. Pat. No. 3,620,143, while an exposure logic circuit suited for use at function block 134 is described in U.S. Pat. No. 3,641,891.

As may be apparent from the foregoing, in order for the control system used with the exposure mechanism of the invention to operate with desired accuracy, the opening motion of exposure mechanism blades 24 and 26 should be consistent. This consistency is necessary inasmuch as it is desirable that an anticipation function be designed within the shape or contours of secondary openings 56 and 58. This anticipation function serves to accommodate for the slight overtravel occasioned by the inherent inertia characteristics of the mechanism in reversing motion to terminate an interval of exposure. Should the opening movement of blades 24 and 26 be inconsistent from photographic cycle to phographic cycle, the fixed or built in anticipation feature would be ineffective. Further, to minimize the amount of anticipation required for the system, it is desirable that solenoid 70 retract blades 24 and 26 to terminate an exposure as rapidly as possible. A higher rate of retraction assures more effecient shutter operation, particularly where exposures are made at apertures of high f/numbered values. Another desired feature for the dynamic performance of the exposure mechanism resides in the rate of opening movement of exposure mechanism blades 24 and 26. Where this movement may be selectively retarded, control over exposure programming is made available. For instance, a broader range of exposures may be provided at apertures of higher f/numbered values. The instant invention provides for such desirable dynamic performance by controlling the pneumatic reaction of plunger 80 as it is moved reciprocally within winding 72.

Looking to FIG. 3, one version of the pneumatic regulation of the movement of plunger 80 is revealed. Note in the figure that an air chamber 150 is defined between the confronting end faces of plunger 80 and plug 82. Pneumatic communication between chamber 150 and the ambient environment is provided both along a select gap 152 defined between liner 84 and the peripheral surface of plunger 80. Additionally, pneumatic communication is provided by an orifice 154 bored within the central portion of plug 82. The outer surface of orifice 154 is selectively valved or regulated by a flap valve 156 formed of a resilient reed 158 mounted in cantilever fashion from a base 160 which, in turn, is attached to frame 76 by rivets 162. With the arrangement shown, as plunger 80 is retracted rapidly within winding 72 during the energization thereof, air within chamber 150 is vented through orifice 154, venting being permitted by virtue of reed 158 being driven outwardly by air movement. During outward movement of plunger 80 during an exposure interval, reed 158 of flap valve 156 covers orifice 154 and the rate of movement of plunger 80 is pneumatically retarded in correspondence with the size of gap 152. Looking momentarily to FIG. 6, the effects emanating from such gap regulation are revealed by curves showing aperture development during outwardly directed plunger travel. Curve 170 provides a nominal representation in which flap valve 156 is not present and orifice 154 is permitted to vent chamber 150. The resultant elapsed opening interval may be seen to amount to about 20 milliseconds. Curve 172 reveals the effect of closing down the clearance provided by gap 152 a select amount. Note that the lapsed interval of opening has been selectively elongated to about 25 milliseconds. Where flap valve 156 is provided in conjunction with control over the clearance of gap 152, curves as at 174 may be developed wherein about a 35 millisecond total elapsed interval of opening may be derived. Note, therefore, that with the pneumatic control over the operation of plunger 80 within solenoid 70 more precise exposure regulation is provided.

Figure 6:
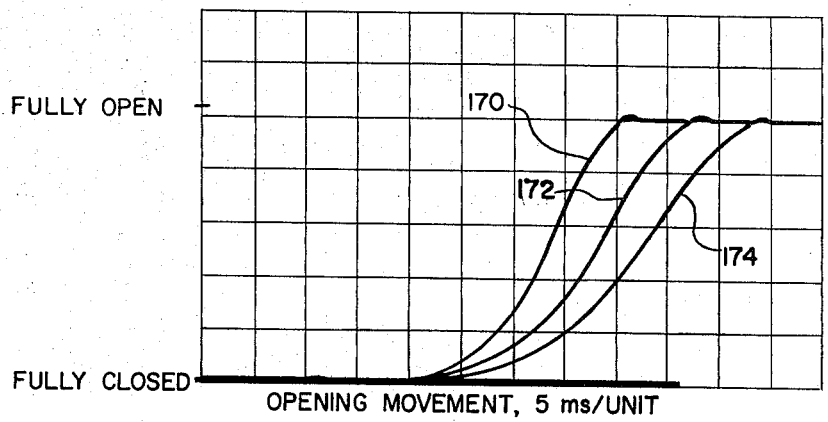
FIG. 6 is a family of curves drawn from oscillotraces showing varying forms of dynamic response derived in operating exposure control mechanisms similar to that shown in FIGS. 1 and 2.
Figure 7:
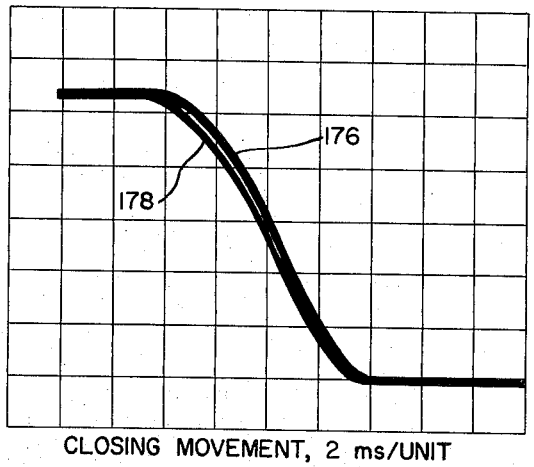
FIG. 7 is a reproduction of an oscillotrace showing the operation of an exposure mechanism similar to that displayed in FIGS. 1 and 2 and showing certain closing characteristics thereof.
Figure 8:
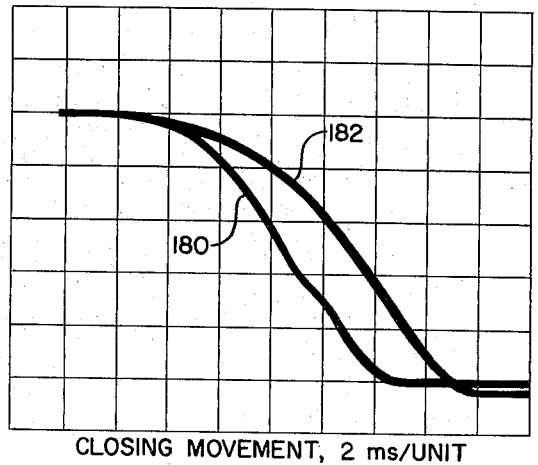
FIG. 8 is a copy of an oscillotrace depicting closing dynamic performance of an exposure mechanism similar to that shown in FIGS. 1 and 2 during shutter closing.

Turning to FIG. 7, the performance of a solenoid similar to that shown in FIG. 3 is revealed during the retracting movement of plunger 80. The curves shown therein at 176 and 178 trace the dynamic performance of plunger 80 under an arrangement wherein gap 150 is that deriving curve 170 of FIG. 6. Additionally, orifice 154 was plugged. The drawing of the oscillotrace reveals that closing time under relatively larger clearances for gap 150 amount to about 9 milliseconds. Looking to FIG. 8, a solenoid having a plunger gap corresponding with curve 172 of FIG. 6 is shown at curve 180. Curve 180 also was derived utilizing an open orifice 154. Note from the curve that a desirable short closing interval of about 9 milliseconds was derived. Conversely, should the same solenoid arrangement be operated under conditions wherein orifice 154 is plugged, curve 182 is derived representing close to a 12 millisecond closing time. From the foregoing it may be seen that by regulating the size of gap 152 and incorporating orifice 154, a desirable retardation of plunger opening movement is provided as well as an enhanced closing or retracting performance. Further, the curves reveal that opening movement may be controlled pneumatically to improve the performance of the exposure mechanisms.

Turning to FIG. 4, another arrangement for pneumatically regulating the rate of travel of plunger 80 is revealed. In this embodiment, a needle valve identified generally at 190 is inserted within plug 82. The valve assembly 190 includes an orifice 192 and a needle or regulator 194. To provide for adjustable mounting, plug 82 is centrally tapped at 196. A slot as at 198 in the outer periphery of regulator 194 provides for the adjustment thereof. Air passages from the orifice 192 and around the needle or regulator 194 is provided by openings (not shown) cut within the threaded enlarged supporting portion of needle 194. With the instant embodiment, the dynamic opening characteristics of plunger 80 may be factory calibrated through the simple expedient of selectively adjusting the valve 190.

Since certain changes may be made in the abovedescribed mechanism and apparatus without departing from the scope of the invention herein involved, it is intended that all matter contained in the description thereof and as shown in the accompanying drawings shall be interpreted as illustrative and not in a limiting sense.

I claim:

1. An exposure control system comprising:
   means defining a light entrance opening;
   exposure mechanism means movable about said opening between a closed position blocking the passage of light therethrough and open positions, said opening movement defining a time-dependent variation of aperture values over said opening;
   drive means for driving said exposure mechanism means between said positions and including a solenoid having an excitation winding and plunger means arranged in driving association with said exposure mechanism means and retractable to a given location within said excitation winding upon energization thereof, said plunger means being mounted within said solenoid so as to be pneumatically reactive during movement thereof, spring means for exerting a bias to move said plunger means from said retracted location and effect said exposure mechanism means movement toward said open positions upon de-energization of said excitation winding, said solenoid including pneumatic regulation means providing an orifice within said solenoid and being selectively configured to pneumatically regulate the rate of said biased plunger means movement so as to control the rate of said exposure mechanism means opening movement, said regulation means being configured to facilitate the rate of said plunger means movement into said retracted location when said excitation winding is energized; and control means for selectively energizing and de-energizing said excitation winding to control the said movement of said exposure mechanism means so as to define a select exposure value.

2. The exposure control system of claim 1 in which said solenoid includes means defining a linear positioned intermediate said plunger means and said excitation winding, said liner and said plunger means being mutually dimensioned so as to define a gap of predetermined size therebetween, said gap size being selected to pneumatically affect the rate of said plunger means movement.

3. The exposure control system of claim 1 in which: said pneumatic regulation means includes means defining a valve, said valve being connected with said solenoid and configured to pneumatically regulate the rate of said biased plunger means movement.

4. The exposure control system of claim 3 in which said means defining a valve is present as an adjustable needle valve.

5. The exposure control system of claim 3 in which said means defining a valve is present as a flap valve.

6. An exposure control system for photographic apparatus of a variety having an entrance opening for the passage of scene light, comprising:
exposure mechanism means movable over said opening between a closed position blocking the passage of light therethrough and open positions, said exposure mechanism means being configured to define a variation of aperture values at said opening when so moved;
drive means controllable to drive said exposure mechanism means between said positions and including regulator means pneumatically retarding said movement toward said open positions and facilitating the rate of said movement into said closed position; and
control means for controlling said drive means to define a value of exposure.

7. The exposure control system of claim 6 in which said drive means includes a solenoid having an excitation winding and plunger means movable to a retracted position therewithin upon energization thereof, said solenoid being configured such that said plunger means is pneumatically reactive upon movement thereof.

8. The exposure control system of claim 7 in which said solenoid includes means defining a liner positioned intermediate said plunger means and said excitation winding, said liner and said plunger means being mutually dimensioned so as to define a gap of predetermined size therebetween, said gap size being selected to pneu- matically regulate the rate of said plunger means movement.

9. The exposure control system of claim 7 in which:
said plunger means is configured for drivably controlling the said movement of said exposure mechanism means;
said drive means includes spring means for exerting a bias urging said plunger means to move from said retracted position so as to effect said exposure mechanism means movement toward said open positions; and
said regulator means includes valve means for selectively controlling the rate of said plunger means movement under said spring means bias.

10. The exposure control system of claim 9 in which said valve means is present as an adjustable needle valve.

11. The exposure control system of claim 9 in which said valve means is present as a flap valve.

12. The exposure control system of claim 9 in which said solenoid is configured including a cylindrical core and plug positioned intermediate said excitation winding and said plunger means, said plunger means being configured with respect to said core and plug to form a pneumatic compartment having a controlled air flow effective to selectively retard said plunger means movement under said spring means bias.

13. The exposure control system of claim 12 in which said regulator means includes valve means for selectively venting said pneumatic compartment.

14. The exposure control system of claim 13 in which said valve means is present as a flap valve.

15. The exposure control system of claim 13 in which said valve means is present as an adjustable needle valve.

16. An exposure control system comprising:
exposure mechanism means movable between a closed position blocking the passage of scene light through an exposure aperture and open terminal positions, said movement establishing a variation of aperture values over said exposure aperture representing a first exposure parameter;
drive means controllable for moving said exposure mechanism means between said positions and including a solenoid having an excitation winding and plunger means movable to a retracted position therewithin upon energization thereof, said solenoid being configured such that said plunger means movement defines a variable air chamber pneumatically affecting the rate of said movement, said plunger means movement away from said retracted position being pneumatically regulated by regulator means to derive a movement rate for said exposure mechanism means movement toward said open terminal position; and
control means for controlling said drive means to move said exposure mechanism means at said given rate and subsequently to move said exposure mechanism into said closed position to define an interval of exposure representing a second parameter of exposure, said first and second parameters of exposure defining a predetermined value of exposure.

17. The exposure control system of claim 16 in which said regulator means is operative to selectively vent said air chamber.

18. The exposure control system of claim 16 in which said regulator means includes an adjustable needle valve.

19. The exposure control system of claim 16 in which said regulator means includes a flap valve operative to vent said air chamber when said plunger means is moved toward said retracted position.

20. Exposure control apparatus for a photographic camera comprising:
  exposure mechanism blade means movable between a closed terminal position and open positions, and configured to define a variation of aperture values when so moved;
  means biasing said exposure mechanism blade means to move toward said open positions;
  a solenoid having an excitation winding and a plunger assembly retractable thereinto upon energization thereof, said plunger assembly being mounted within said solenoid to be pneumatically reactive during its said movement and being associated in driving relationship with said exposure mechanism blade means to move said blade means toward said closed terminal position when said winding is energized and movable with said blade means from said retracted orientation under said bias upon de-energization of said winding; and
  pneumatic means including valve means coupled to said solenoid for selectively pneumatically retarding said plunger assembly movement upon de-energization of said winding so as to regulate the rate of said exposure mechanism blade means movement under said bias and derive a programmed variation of said aperture values.

21. The exposure control apparatus of claim 20 in which said valve means is operative to facilitate the said retracting movement of said plunger assembly when said excitation winding is energized.

22. The exposure control apparatus of claim 20 in which said valve means includes a needle valve.

23. In an exposure control systeem of a variety including an exposure mechanism movable under spring bias to define a variation of aperture values and a solenoid having an excitation winding and a plunger retractable thereinto upon energization thereof, said plunger being associated in driving relationship with said exposure mechanism and movable outwardly from said winding under said bias, the improvement comrising:
  pneumatic regulator means positioned upon said solenoid and configured to selectively retard said outward movement of said plunger so as to dynamically control said aperture value variation in accordance with a predetermined program.

24. The invention defined by claim 23 in which said pneumatic regulator means includes a needle valve pneumatically associated with said solenoid.

25. The invention defined by claim 23 in which said pneumatic regulator means includes a flap valve pneumatically associated with said solenoid.

26. A solenoid assembly for use with an exposure control system of a variety including an exposure mechanism movable in one direction under spring bias to define a time-dependent variation of aperture values, said mechanism being movable in a second direction to terminate an interval of exposure, said assembly comprising:
  an excitation winding;
  a plunger retractable within said winding upon energization thereof, one end of said plunger being drivably associated with said exposure mechanism means and being configured to be moved outwardly from said retracted position by said spring bias;
  means defining a pneumatic chamber within which said plunger is retractable; and
  means for selectively venting said chamber to regulate by selective retardation the rate of movement of said plunger under said spring bias so as to dynamically control said aperture value variation in accordance with a predetermined program, said selective venting means facilitating said plunger movement during said winding energization.

27. The solenoid assembly of claim 26 in which said selective venting means includes a flap valve.

28. The solenoid assembly of claim 26 in which said selective venting means includes an adjustable needle valve operative to effect said selective retardation of the rate of said plunger movement under said spring bias.

29. The solenoid assembly of claim 26 in which said assembly includes:
  an insulative lining, and
  a solenoid plug forming a portion of the magnetic circuit of said solenoid assembly and configured and arranged with said lining and said plunger to define said pneumatic chamber.

30. The solenoid assembly of claim 29 in which said venting means is formed within said plug.

31. Photographic exposure apparatus comprising:
  exposure mechanism blade means mounted for movement between a positin wherein it will preclude the passage of scene light therethrough and at least one other position wherein it defines an opening through which scene light will pass;
  means for effecting movement of said exposure mechanism blade means between its said positions, said movement effecting means including a solenoid having an excitation winding and a plunger movable from a first position in a predetermined direction with respect to said excitation winding responsive to the energization of said excitatin winding;
  means for returning said plunger in its opposite direction when said excitation winding is deenergized; and
  means for pneumatically retarding the displacement of said plunger in its said opposite direction under the influence of said returning means.

* * * * *

Disclaimer

3,868,712.—*Conrad H. Biber*, Needham, Mass. PNEUMATICALLY REACTIVE EXPOSURE CONTROL SYSTEM. Patent dated Feb. 25, 1975. Disclaimer filed Sept. 23, 1976, by the assignee, *Polaroid Corporation*.

Hereby enters this disclaimer to claim 6 of said patent.

[*Official Gazette November 23, 1976.*]